United States Patent [19]
Takeda

[11] Patent Number: 5,499,228
[45] Date of Patent: Mar. 12, 1996

[54] LENS CLEANER FOR A DISK PLAYER

[76] Inventor: Ken'ichi Takeda, 10-2, Kizugawadai 1-chome, Kizu-cho, Soraku-gun, Kyoto, Japan

[21] Appl. No.: 130,901

[22] Filed: Oct. 4, 1993

[30] Foreign Application Priority Data

Oct. 3, 1992 [JP] Japan .................................. 4-289292

[51] Int. Cl.⁶ .................................................. G11B 7/00
[52] U.S. Cl. .................................... 369/71; 369/292
[58] Field of Search ............................ 369/71, 72, 292; 360/128, 137

[56] References Cited

U.S. PATENT DOCUMENTS

| | | | |
|---|---|---|---|
| 5,038,336 | 8/1991 | Kitazawa | 369/71 |
| 5,040,160 | 8/1991 | Moriya | 369/71 |
| 5,088,083 | 2/1992 | Olson | 369/71 |
| 5,117,411 | 5/1992 | Nakagawa | 369/72 |

FOREIGN PATENT DOCUMENTS 04221432  8/1992  Japan ...................................... 369/71

*Primary Examiner*—Stuart S. Levy
*Assistant Examiner*—Paul J. Ditmyer
*Attorney, Agent, or Firm*—Evenson, McKeown, Edwards & Lenahan

[57] ABSTRACT

A lens cleaner capable of being adapted compatibly to all optical type disk players like CD player or CD-Rom drive. The disk of the lens cleaner has an introductory recording area for recording some computer program data on the inner part of a program area. A large gap area and a sound/program recording area are provided continuously to the introductory recording area. The width of the gap area is determined by changing the TOC data in the lead area. Brushing hair bundles are planted on the gap area, in which all detected signals are ignored by the player to complete the cleaning operation.

4 Claims, 2 Drawing Sheets

LENS CLEANER FOR A DISK PLAYER

BACKGROUND AND SUMMARY OF THE INVENTION

The present invention relates to a lens cleaner for a disk player, which includes many types of devices such as a CD (compact disk) player, a CD-ROM (compact disk-read only memory) drive, CDV (compact disk video) player, CD-I (compact disk-interactive) player or a LD (laser disk) player having compatibility with CDs.

A conventional lens cleaner is disclosed in U.S. Pat. No. 5,117,411 as an example. The lens cleaner has brushing hair bundles formed by an assembly of about ten brushing hairs and implanted spirally on a disk with some spacing. To be more precise, some dispersion centers are set so that a phase may be shifted by 45 degrees counterclockwise from an imaginary fundamental point provided on a 1 mm outer point from the edge of the lead-in area and a shift may brought about by 1.5 mm in the radial direction from a circle passing through the imaginary fundamental point radially and outwardly at every phase shift. Each dispersion center has the air bundle implanted on it.

The above-described lens cleaner can clean a pickup lens in almost all CD players. Yet, some CD players will compulsorily stop the cleaning operation soon after the cleaning start or in the middle of the cleaning. In this case, the lens cleaner may cause "no disk error" in the player for example.

Every CD has a lead-in area as a standard in a region of 2 mm wide provided between 2 mm and 25 mm radially from the disk center. Yet, it is possible to produce a CD having a lead-in area that is set on a little different position from the standard. Therefore, many CD players controllably move the pickup lens compulsorily slightly beyond the standard lead-in area preventing the player from causing errors like burst error. The conventional lens cleaner could clean a pickup lens only for certain CD players. In other words, the compatibility of the lens cleaner depends on the control system in each CD player after all.

Some applied CD products like CDV, CD-ROM or CD-I players also may compulsorily stop the cleaning operation by the conventional lens cleaner. For example, a CD-ROM drive having the conventional lens cleaner in it will stop soon after starting to read data in a program area because of the reading error.

SUMMARY OF THE INVENTION

An object of the present invention is to provide a lens cleaner capable of cleaning a pickup lens certainly in every CD player or CDV player independent of the different types of player or manufacturing company.

A further object of the present invention is to provide a lens cleaner capable of adapting compatibly to all kinds of CD player like CDV player, CD-ROM drive or CD-I player.

Every CD can manage all signals at, a unit of one frame (588 bits) and a sector of 98 frames. A gap between each sector is provided for detecting the start and end of one sector. The gap length corresponds to about one second of radio signal and is defined by the TOC (table of contents) data recorded in the lead-in area. In the gap area, players ignore all errors like burst error.

The present invention takes advantage of the specific character for the gap area. To be more precise, a principle of the present invention is that a large gap area providing a cleaning device like a brushing hair bundle is secured on a certain position of a disk by changing the TOC data relating to the gap length.

According to the lens cleaner for a CD player of the present invention, a lens cleaner has a cleaning device on a disk, and the disk comprises a large gap area and a sound/program recording area provided continuously in a program area, in which the cleaning device is implanted on the gap area.

It is desirable that some audio data for explaining the use of the lens cleaner is recorded in an inner recording area between a lead-in area and the gap area.

Moreover, the lens cleaner has a cleaning device on a disk, and the disk comprises an introductory recording area recording computer program data in an inner area of a program area and a big gap area and a sound/program recording area provided continuously to the introductory recording area, in which the cleaning device is planted on the gap area.

It is desirable that computer program data treated as audio data is recorded in the introductory recording area, and the computer program data is for explaining use of the lens cleaner with voice.

As described above, a CD player ignores all errors like burst error in the gap area. Therefore, if a cleaning device like a brushing hair is implanted on a large gap area, the player does not stop the operation by its reading error.

The sound/program recording area continuous to the gap area hastens the tracing speed to the gap area by the pickup lens and shortens the cleaning time by the cleaning device. To be specific, if the pickup lens is skipped to the sound/program recording area, the lens crosses the gap area at high speed.

According to the CD-ROM drive or CD-I player, after it has read the contents in the lead-in area, it continuously intends to read computer program data in the initial part of the program area. If the player cannot read the data at the moment, it will automatically stop the operation as a reading error. Therefore, the introductory recording area recording some computer program data is provided in the inner end of the program area to prevent such a situation.

On the other hand, a CD player treats the computer program data as audio data. Therefore, the play back sound of the computer program data by the player becomes mere noise. For preventing the noise and informing an operator of directions for use of the lens cleaner by voice, the introductory recording area records some data that has fundamentally the same format as the computer program data but is substantially audio data.

The present invention has a large gap area on a certain position in the program area by changing the contents in the TOC data. Since a cleaning device like a brushing hair bundle is implanted on the gap area, the player does not stop the operation because of reading error. The cleaning device may clean the surface of the pickup lens while the lens crosses over the gap area from the lead-in area or the inner program area to the sound/program recording area.

Therefore, any player, which performs the exact control to the movement of the pickup lens corresponding to the predetermined width for the read-in area, can clean the surface of the pickup lens. Also every CD player or CDV player independent of the difference of the manufacturing company or the type can clean the lens.

The present invention also has an introductory recording area recording computer program data between the gap area and the lead-in area, and a sound/program recording area continues to the gap area having a cleaning device. Therefore, the lens cleaner is compatible with CD or CDV players as well as CD-ROM drives or CD-I player to clean a pickup lens without problems.

The width of the gap area is freely changed by modifying the contents in the TOC data. Therefore, a sufficient area is secured for the cleaning chip corresponding to the size or the arrangement of the chip. Also, the position of the cleaning chip is freely determined in the program area. It is also possible to make plural gap areas if needed.

Other objects, advantages and novel features of the present invention will become apparent from the following detailed description of the invention when considered in conjunction with the accompanying drawings.

DETAILED DESCRIPTION OF THE DRAWINGS

Figure 1:
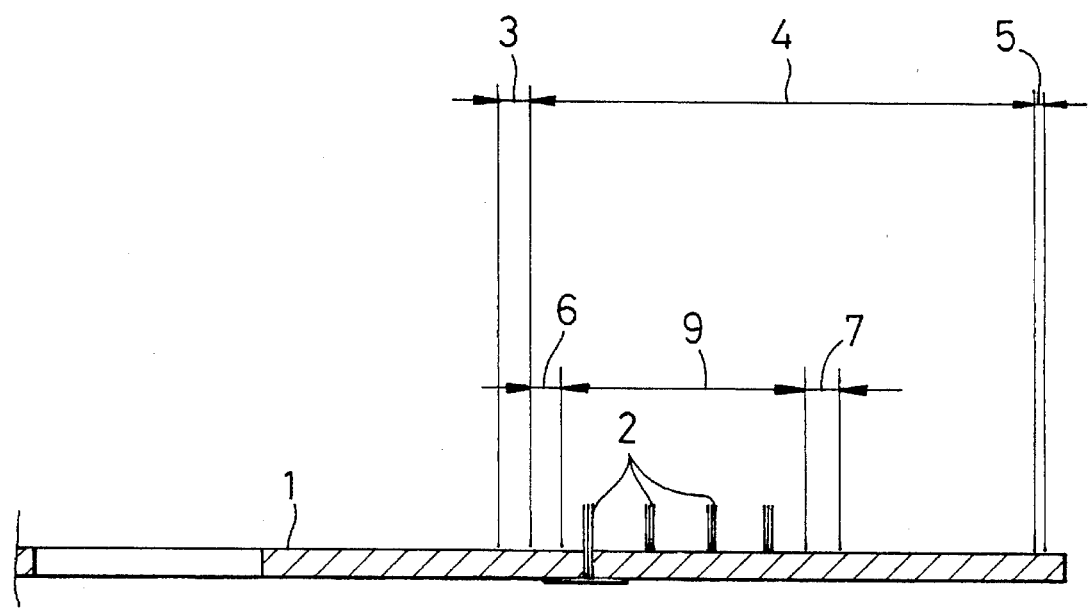
FIG. 1 is a sectional view showing a principal part of a lens cleaner constructed in accordance with an embodiment of the present invention.
Figure 2:
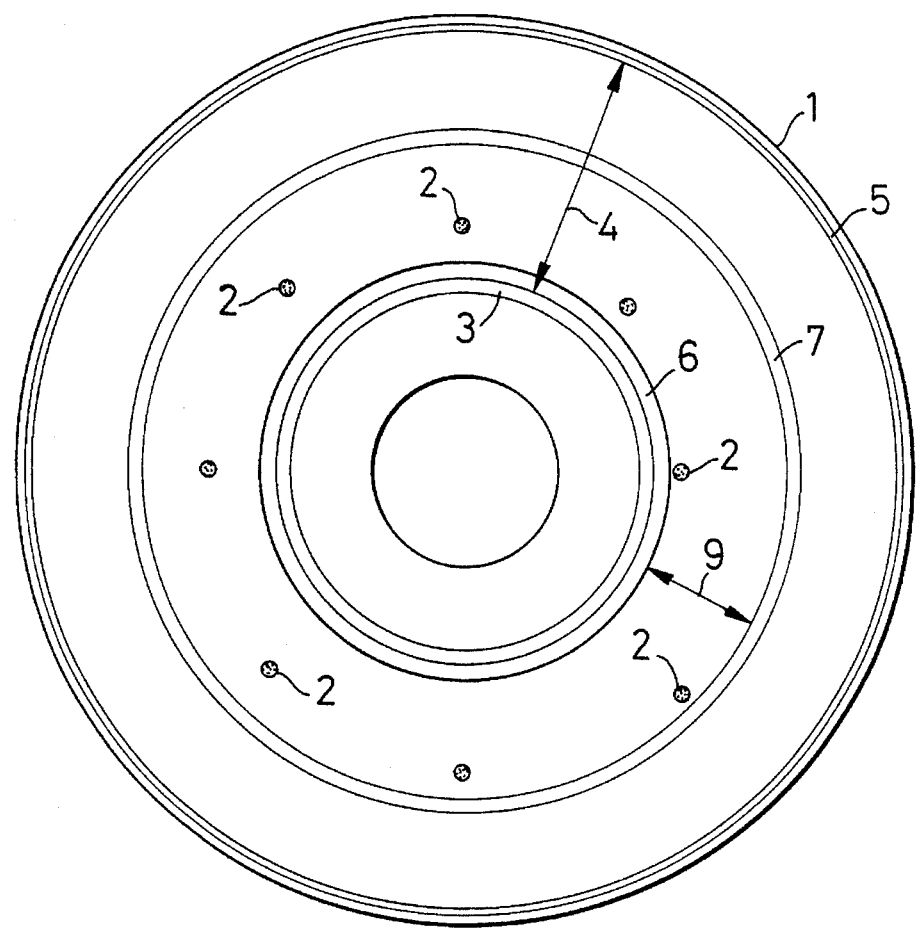
FIG. 2 is a plan view of the entire lens cleaner of FIG. 1.
Figure 3:
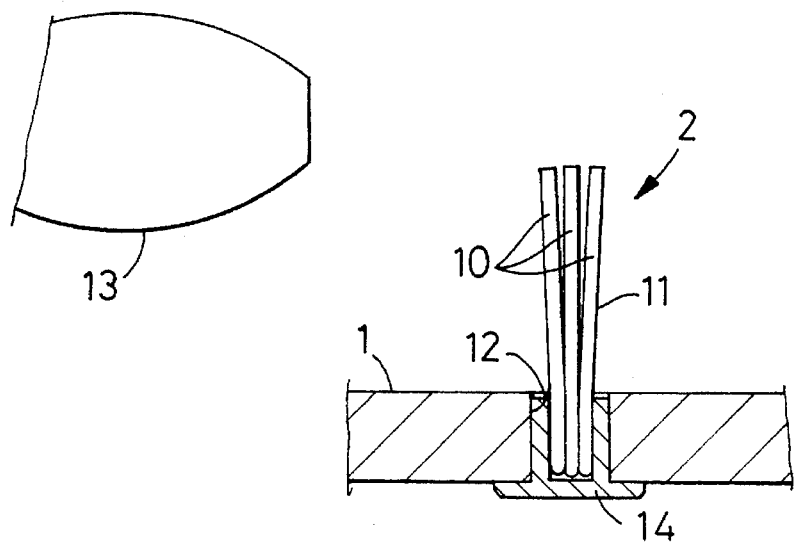
FIG. 3 is a sectional view showing detailed structure of a cleaning chip of the lens cleaner of the present invention.

FIGS. 1 to 3 show an embodiment of a compatible lens cleaner applicable to different types of optical disk players such as a CD player or a CD-ROM drive.

In FIG. 1, the lens cleaner has a disk 1 shaped substantially the same as a CD and a plurality of cleaning chips 2 implanted on a signal-recording side of the disk 1.

The signal-recording side of the disk 1 has a lead-in area 3, a program area 4 and a lead-out area 5 according to its standard. Though the lead-in area 3 repeatedly records TOC data, the data is different from conventional TOC data of a CD or a CD-ROM with respect to its gap length data.

To be more precise, the program area 4 has an introductory recording area 6 on its innermost edge, and a sound/program recording area 7 located radially separated by about 16 mm from the end of the introductory recording area 6. A gap length is determined such that the whole area 9 between both recording areas 6 and 7 becomes entirely one large gap, and is recorded in the TOC data as gap length data.

According to the specific CD-ROM drive or CD-I player, after it has read the contents in the lead-in area 3, it continuously attempts to read computer program data in the initial part of the program area 4. If the player cannot read the proper data at the moment, it will automatically stop the operation as a reading error. Therefore, some computer program data has to be recorded in the introductory recording area 6 to prevent such situation.

On the other hand, the CD or CDV player treats the computer program data as audio data. Therefore, the play back sound of the program data by the player becomes mere noise. For preventing the noise and informing an operator of directions for use of the lens cleaner by voice, the computer program data is modified in the manner of audio data so as to play back the explanation for use of the lens cleaner with background music. Though the audio data is meaningless as a computer program, the CD-ROM drive does not stop the operation. The width of the introductory recording area 6 is about 2 mm, for example.

The cleaning chips are spirally located on the large gap area 9 that is secured by the TOC data. A brushing hair bundle 11 formed of the plural brushing hairs is one unit as shown in FIG. 3, and some units are spirally planted on the disk 1 with a holder 14 as shown in FIG. 3. Each space between two units in the radial direction is sufficiently larger than the diameter of a pickup lens 13.

The width of the gap area 9 in the radial direction is about 16 mm. In the gap area 9, the player ignores all of the contents of a signal. Therefore, the diameter of each implanting hole 12 can be determined to be large enough without presenting a problem. In addition, the size and position of each cleaning chip 2 is not limited except for interfering with the focusing or tracking operation of the pickup lens 13.

The sound/program recording area 7 records usual music data. The recording area 7 is provided for skipping the pickup lens 13 from the introductory recording area 6 and preventing the player from detecting an error soon after the skipping of the pickup lens 13.

When the above lens cleaner 1 is inserted into a CD player, the player automatically reads data from the lead-in area 3 at first. After pushing the play button, the player starts to read data from the introductory area 6 through the pickup lens 13. In the reading period from the introductory area 6, the CD player plays back the data to explain the use of the lens cleaner with voice and to make a requested announcement for a next music selection In response to this announcement, the operator can push a skip button on the CD player to change the operating mode of the player. When the operator has selected this action, the pickup lens 13 rapidly moves across the gap area to the inner end of the sound/program recording area 7, which is the starting point of the next music that may be recorded. During the crossing through the gap area 9, each tip portion of the brushing hair bundle 11 planted on the gap area 9 may contact the surface of the pickup lens 13 in turn to brush dust off the lens surface.

As described above, the cleaning for the pickup lens 13 has already finished when the CD player starts to play back the data on the sound/program recording area 7. Therefore, after this operation, the operator can push on the stop and eject button to remove the lens cleaner from the CD player. It is also possible to push on the repeat button to clean the pickup lens 13 repeatedly. The cleaning operation for a CDV player is substantially the same as the CD player.

When inserting the lens cleaner into a CD-ROM drive or a CD-I player, the player reads data continuously from the lead-in area 3 and the introductory area 6. After the access to the introductory area 6, the pickup lens 13 moves to the sound/program recording area 7 across the gap area 9 to read the next program data. During the crossing through the gap area, 9, the player ignores the gap area 9 to clean the pickup lens 13. For instance, the player may proceed with the cleaning operation automatically after the insertion of the lens cleaner, and stand ready for a next operation after the reading of all data in the sound/program recording area 7. Though the CD-ROM drive cannot play back any music from the data in the sound/program recording area 7, in another embodiment the CD-I player can play back music like the CD player.

In the case of a special lens cleaner for a CD or CDV player, some audio data similar to the data in the sound/program recording area 7 may be recorded in the inner program area corresponding to the introductory recording area 6. The player can play back the data as the explanation of the use of the lens cleaner.

The introductory recording or inner program area 6 can be omitted in certain embodiments. In this case, the large gap area 9 is provided between the lead-in area 3 and the first music area in the sound/program recording area 7.

The start and end position or the number of the gap area 9 can be freely changed at need. For example, two gap areas 9 and two sound/program recording areas 7 can be placed one after the other. The inner gap area 9 can a liquid type cleaning chip 2 and the outer gap area 9 a dry type cleaning chip 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A lens cleaner, comprising a cleaning device, and a disk having a lead-in area for recording TOC data including gap length data, a program area located radially outward of the lead-in area and including an introductory recording area, a gap area having a gap length of about 16 mm containing the cleaning device and a sound/program recording area provided radially outward of the gap area and continuously in the program area.

2. A lens cleaner according to claim 1, wherein audio data is recorded in an inner recording area between a lead-in area and the gap area.

3. A lens cleaner, comprising a cleaning device, and a disk having a lead-in area for recording TOC data including gap length data, an introductory recording area located radially outwardly of the lead-in area and containing computer program data, a gap area having a gap length of about 16mm located radially outward of the introductory recording area and provided with the cleaning device, a sound/program recording area provided radially outward of the gap area and a lead-out area spaced from and located radially outward of the sound/program recording area.

4. A lens cleaner according to claim 3, wherein the computer program data is recorded in the introductory recording area for audibly explaining use of the lens cleaner.

* * * * *